(12) United States Patent
Ou et al.

(10) Patent No.: US 12,447,512 B2
(45) Date of Patent: Oct. 21, 2025

(54) MULTI-AXIS VARIABLE-SPEED HOT WASHING MACHINE

(71) Applicant: ZHEJIANG BORETECH ENVIRONMENTAL ENGINEERING CO., LTD., Zhejiang (CN)

(72) Inventors: Zhewen Ou, Zhejiang (CN); Hui Dong, Zhejiang (CN)

(73) Assignee: ZHEJIANG BORETECH ENVIRONMENTAL ENGINEERING CO., LTD., Zhejiang (CN)

( * ) Notice: Subject to any disclaimer, the term of this patent is extended or adjusted under 35 U.S.C. 154(b) by 0 days.

(21) Appl. No.: 18/272,547

(22) PCT Filed: Dec. 21, 2022

(86) PCT No.: PCT/CN2022/140671
§ 371 (c)(1),
(2) Date: Jul. 14, 2023

(87) PCT Pub. No.: WO2023/116762
PCT Pub. Date: Jun. 29, 2023

(65) Prior Publication Data
US 2024/0075504 A1 Mar. 7, 2024

(30) Foreign Application Priority Data
Dec. 24, 2021 (CN) .......................... 202111595968.X

(51) Int. Cl.
*B08B 3/10* (2006.01)
*B08B 1/16* (2024.01)
(Continued)

(52) U.S. Cl.
CPC .............. *B08B 3/104* (2013.01); *B08B 1/165* (2024.01); *B08B 1/20* (2024.01); *B08B 7/04* (2013.01);
(Continued)

(58) Field of Classification Search
None
See application file for complete search history.

(56) References Cited

U.S. PATENT DOCUMENTS

| 5,123,993 A | 6/1992 | Wiggins |
| 5,443,652 A * | 8/1995 | Scarola ................... B29B 17/02 |
| | | 241/DIG. 38 |

FOREIGN PATENT DOCUMENTS

| CN | 102806214 A | 12/2012 |
| CN | 111957655 A | 11/2020 |

(Continued)

OTHER PUBLICATIONS

CN213674977U translation (Year: 2020).*
(Continued)

*Primary Examiner* — Rita P Adhlakha
(74) *Attorney, Agent, or Firm* — Juan Carlos A. Marquez; Marquez IP Law Office, PLLC

(57) ABSTRACT

A multi-axis variable-speed hot washing machine is provided, including a cleaning chamber, a drive apparatus, and a rotation mechanism. The rotation mechanism is arranged in an inner cavity of the cleaning chamber and is in transmission connection with the drive apparatus. At least one or more groups of rotation mechanism is arranged. The inner wall of the cleaning chamber is provided with a scraping mechanism that enhances a squeezing and frictional cleaning effect on a to-be-cleaned material.

20 Claims, 8 Drawing Sheets

(51) Int. Cl.
  *B08B 1/20* (2024.01)
  *B08B 7/04* (2006.01)
  *B29B 17/00* (2006.01)
(52) U.S. Cl.
  CPC . *B08B 2203/007* (2013.01); *B29B 2017/0015* (2013.01)

(56) References Cited

FOREIGN PATENT DOCUMENTS

| CN | 112058762 A | 12/2020 |
| CN | 213674977 U | 7/2021 |
| CN | 114434682 A | 5/2022 |
| DE | 102014106888 A1 | 9/2015 |
| JP | 2008194625 A | 8/2008 |
| KR | 20160039828 A | 4/2016 |
| KR | 101941462 B1 | 1/2019 |
| WO | 2018115104 A1 | 6/2018 |

OTHER PUBLICATIONS

PCT International Search Report mailed Feb. 25, 2023 in counterpart PCT application PCT/CN2022/140671, 3 pages in English.
European Extended Search Report mailed Jan. 21, 2025 in European counterpart application EP22910074.8, 9 pages in English.

\* cited by examiner

MULTI-AXIS VARIABLE-SPEED HOT WASHING MACHINE

CROSS-REFERENCE TO RELATED APPLICATION

This application is a national stage application filed under 35 U.S.C. 371 of International Application No. PCT/CN2022/140671 filed Dec. 21, 2022, which claims priority to China Patent Application 202111595968.X filed Dec. 24, 2021. The entire disclosures of the above applications are incorporated herein by reference in their entirety.

FIELD OF THE INVENTION

The present invention relates to the field of plastic recycling technologies, and in particular, to a multi-axis variable-speed hot washing machine.

BACKGROUND OF THE INVENTION

With the rapid economic development in China, the economic development model of recycling renewable resources for continuous material recycling is becoming a trend. Through integrating limited resources for the recycling of renewable resources, waste materials can regain use value, and waste is turned into wealth, thereby reducing environmental pollution and promoting sustainable economic and social development.

Therefore, recycling renewable solids and waste plastics and improving a recycling level of renewable resources are urgent problems to be resolved currently. A renewable solids and waste plastics recycling system generally uses a physical method, and includes equipment for processes o sorting, raw material preprocessing, cleaning, drying, granulation. Cleaning of the renewable solids and waste plastics is crucial. The renewable solids and waste plastics need to be fully cleaned, so that organic and inorganic residues in the cleaned materials can be minimized, quality is infinitely close to raw materials, and there are wider fields for recycling.

In the prior art, referring to FIG. 1, plastic bottle flakes processed by a crushing unit respectively enter three hot washing machines through a hot washing feeding screw and a hot washing distributing screw for stirring and hot washing. Each hot washing machine is a barrel with a smooth inner wall, and a single cleaning blade shaft is arranged in an inner cavity of the hot washing machine. During hot washing, an appropriate amount of medicinal water is added into the hot washing machines, and after stirring and cleaning in high-temperature medicinal water for a period of time, dirt and impurities on the bottle flakes are removed and paper labels or glue on the bottle flakes are softened.

After the hot washing is completed, the materials enter a feeding screw conveyor through discharging ports at the bottoms of the hot washing machines, and are evenly inputted into a water-free friction machine by the feeding screw conveyor. A rotor rotating at a high speed in the friction machine drives the materials to rotate, so that the bottle flakes rub against blades and the inner wall to scrape off the labels or glue on the bottle flakes. After the friction of the bottle flakes is completed, the bottle flakes are transferred to a dehydrator for dehydration and drying, and then enter a next process.

The foregoing existing technical solution has the following defects: 1. Although the hot washing machines can properly remove the dirt and impurities on the bottle flakes and soften the labels or glue on the bottle flakes, and the friction machine can scrape off the softened labels or glue on the bottle flakes, the hot washing machines and the friction machine are connected through the screw conveyor. The three machines occupy a large volume and take a long time to wash, which increases device costs. Due to a low rotating speed of the traditional hot washing machines, the impurities on the surfaces of the bottle flakes may possibly not be effectively cleaned. For cleaning processes, to effectively remove the dirt and impurities on the bottle flakes, three processes are needed: hot washing-transferring-rubbing, which greatly reduce the cleaning efficiency.

2. The foregoing hot washing machines have a single-shaft structure. During cleaning, the single shaft stirs in the barrel with a smooth inner wall, and the cleaning blade shaft has a low rotating speed. Usually, when the single shaft is stirring, the materials also rotate with the cleaning blade shaft. Due to the high-temperature medicinal water, the bottle flakes float on the water surface or are immersed in the water, so that the surfaces of the materials cannot be fully rubbed, resulting in incomplete removal of the impurities and dirt on the surfaces of the bottle flakes and a poor cleaning effect.

3. The bottoms of the hot washing machines and the feeding screw conveyor are in communication with each other. Therefore, during hot washing, on the one hand, some bottle flakes that have not been fully cleaned enter gaps between blades of the feeding screw conveyor, cannot be fully cleaned, and are directly sent for the friction and drying process after the hot washing is finished, which reduces the cleaning effect on the bottle flakes; and on the other hand, the high-temperature medicinal water in the hot washing machines enters the inclined feeding screw conveyor. With the rotation of the screw blades in the feeding screw conveyor, the high-temperature medicinal water is continuously transferred into the friction machine and directly discharged with the bottle flakes. The water level in the hot washing machines keeps decreasing. In order to ensure the cleaning effect of the hot washing machines, it is necessary to add medicinal water into the hot washing machines several times, which is time-consuming and laborious and increases the consumption of medicinal water and cleaning costs of the enterprise.

4. Because the foregoing feeding screw conveyor is arranged in an inclined manner, one end of a feeding port at the bottom of the feeding screw conveyor is in communication with the bottoms of the hot washing machines through a connecting pipe. During cleaning, some bottle flakes fall into a gap at the bottom of the feeding screw conveyor due to gravity. As a result, the screw blades cannot bring the materials out of a dead angle of the gap, which affects the quality of a next batch of early products when the bottle source is changed.

SUMMARY OF THE INVENTION

For the deficiencies in the prior art, the present invention aims to provide a multi-axis variable-speed hot washing machine, which combines hot washing and friction processes, and can effectively remove dirt and impurities on bottle flakes and improve the cleaning efficiency. In addition, the multi-axis variable-speed hot washing machine occupies a small volume and has short cleaning time, which reduces device costs and has good economic promotion value.

The invention objective of the present invention is implemented by the following technical solution.

A multi-axis variable-speed hot washing machine, including a cleaning chamber, a drive apparatus, and a rotation mechanism, and the rotation mechanism being arranged inside an inner cavity of the cleaning chamber and being in transmission connection with the drive apparatus, where at least one or more groups of rotation mechanism is arranged, and the inner wall of the cleaning chamber is provided with a scraping mechanism that enhances a squeezing and frictional cleaning effect on a to-be-cleaned material.

In a preferred example, the present invention may be further configured as: the scraping mechanism includes a plurality of scraper fixed on the inner wall of the cleaning chamber.

In a preferred example, the present invention may be further configured as: three groups of rotation mechanisms are arranged, and each rotation mechanism is configured with the drive apparatus.

In a preferred example, the present invention may be further configured as: three groups of rotation mechanisms are arranged, and the three groups of rotation mechanisms share the drive apparatus.

In a preferred example, the present invention may be further configured as: the rotation mechanism includes a cleaning blade shaft and a plurality of rotor disks arranged on the cleaning blade shaft in the axial direction, the axial line of the cleaning blade shaft and the axial line of the cleaning chamber being parallel to each other, the cleaning blade shaft being in transmission connection with the drive apparatus, and each rotor disk being provided with several partially inclined blades.

In a preferred example, the present invention may be further configured as: each blade is integrally formed and fixedly connected on the side wall of each rotor disk extending outwardly, and several blades are evenly distributed around the rotor disk in the circumferential direction.

In a preferred example, the present invention may be further configured as: the blade is configured as a strip-shaped plate structure and includes an anti-bending plate and an inclined plate, the anti-bending plate and the inclined plate being integrally formed and fixedly connected to each other, the anti-bending plate being horizontally arranged, and the inclined plate being obliquely arranged.

In a preferred example, the present invention may be further configured as: a reinforcing member is fixedly connected on the rotor disk, and the end of the inclined plate close to the rotor disk is fixed on the reinforcing member.

In a preferred example, the present invention may be further configured as: on a same cleaning blade shaft, blades on any two adjacent rotor disks incline in a same direction or opposite directions.

In a preferred example, the present invention may be further configured as: an angle of inclination of the inclined plate relative to the horizontal anti-bending plate is &, and $0°<\&≤90°$.

In a preferred example, the present invention may be further configured as: & is 21°.

In a preferred example, the present invention may be further configured as: the cleaning chamber is internally provided with a heating mechanism configured to heat cleaning water.

In a preferred example, the present invention may be further configured as: the inner cavity of the cleaning chamber is provided with a plurality of liners, the end of each liner away from the inner wall of the cleaning chamber being offset toward the central axis of the cleaning chamber; and a hot washing sub-cavity is formed between every two adjacent liners, a plurality of hot washing sub-cavities being in communication with each other and forming the inner cavity of the cleaning chamber.

In a preferred example, the present invention may be further configured as: a plurality of rotation mechanisms are respectively evenly distributed in the hot washing sub-cavities.

In a preferred example, the present invention may be further configured as: the heating mechanism includes a plurality of heating rods, the liners are provided with heat conducting oil, and the heating rods are mounted in the liners to heat the heat conducting oil.

In a preferred example, the present invention may be further configured as: a temperature sensor is mounted inside each heating rod.

In a preferred example, the present invention may be further configured as: the outer wall of the cleaning chamber is provided with an insulation layer.

In a preferred example, the present invention may be further configured as: the bottom of the cleaning chamber is provided with a drain valve connected to the inside of the liners.

In a preferred example, the present invention may be further configured as: the bottom of the cleaning chamber is provided with a plug valve connected to the inside of the cleaning chamber.

In a preferred example, the present invention may be further configured as: an a differential pressure transmitter is mounted on the outer side wall of the cleaning chamber.

In a preferred example, the present invention may be further configured as: a cover plate is detachably fixedly connected to the top of the cleaning chamber, and the drive apparatus is mounted on the surface of the cover plate away from the cleaning chamber.

In a preferred example, the present invention may be further configured as: the drive apparatus includes a motor and a bearing seat assembly, the motor being in transmission connection with the bearing seat assembly through a belt, and the bearing seat assembly being in transmission connection with the cleaning blade shaft.

In a preferred example, the present invention may be further configured as: the motor is configured as a variable-frequency motor.

To sum up, the present invention includes at least one of the following beneficial technical effects.

1. During cleaning of plastic bottle flakes, a proportion of materials and medicinal water is added into the cleaning chamber, the rotation mechanisms stir and wash the materials. Dirt and impurities on the bottle flakes are removed, and simultaneously labels or glue on the bottle flakes are softened and removed. During cleaning, bottle flakes rub against other bottle flakes, the rotation mechanisms, the inner wall of the cleaning chamber, and the scraping mechanism, so as to remove softened labels or glue and improve the cleaning effect.

This machine combines the processes of hot washing and friction, and combines the functions of the three devices. Using one device can effectively remove the dirt and impurities on the bottle flakes and improve the cleaning efficiency. In addition, this multi-axis variable-speed hot washing machine occupies a small volume, has a variable speed, a small volume, short time, and high efficiency, thereby reducing device costs and having good economic promotion value.

2. A plurality of cleaning blade shafts are evenly distributed in the cavity of the cleaning chamber. A plurality of liners are arranged inside the cavity. One end of each liner is offset along the central line of the cleaning chamber. In this way, the cleaning blade shafts occupy as much volume as possible in the hot washing sub-cavities, thereby limiting a space where the materials can stay in the cavity, reducing a movement range of the materials and greatly increasing friction between the materials during the operation of the device, and improving the cleaning effect on the bottle flakes.

3. A scraping mechanism is added on the inner wall, and can block the materials during the operation of the device to increase friction. The blades of the cleaning blade shaft are arranged intermittently in the same direction, that is, the orientation between adjacent blades is in a shape of "/\", so that the materials squeeze and rub against each other between the blades when moving between the cleaning blade shafts. A higher rotating speed of the cleaning blade shafts indicates greater friction on the surfaces of the bottle flakes and cleaner bottle flakes after cleaning. The materials are discharged at the bottom through a water pump, thereby reducing device and space costs.

DETAILED DESCRIPTION

Figure 1:
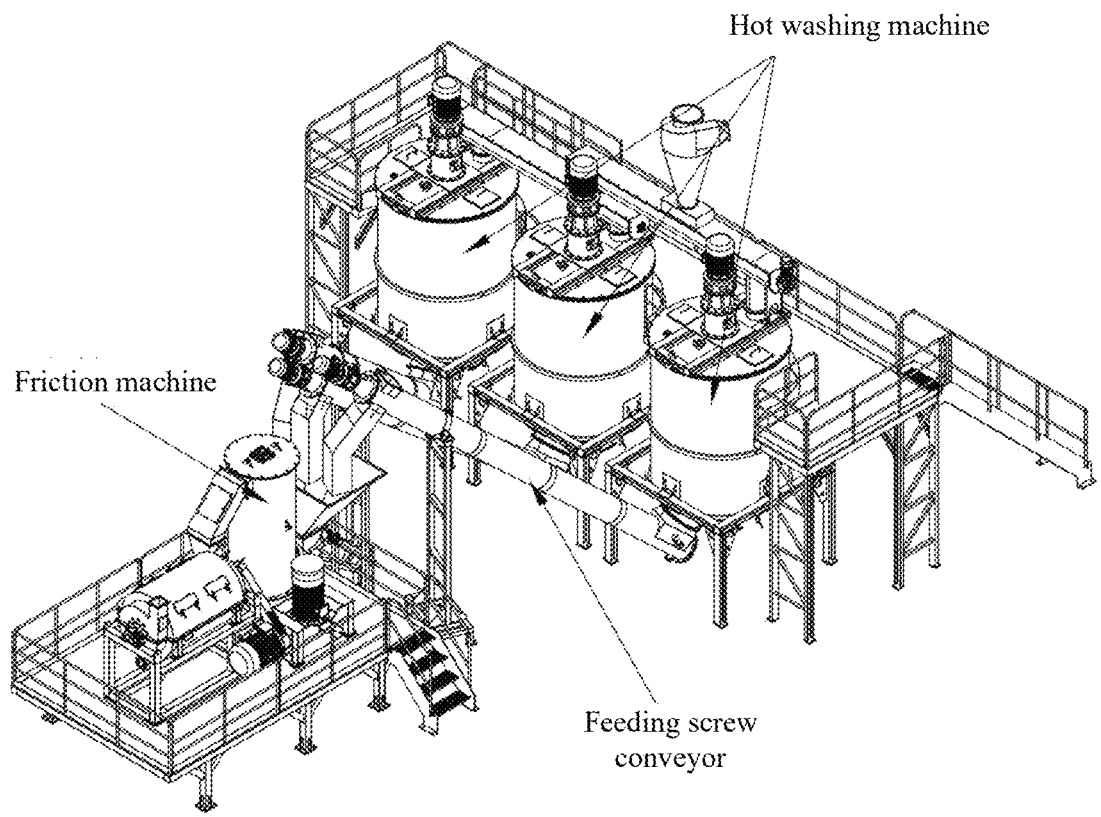
FIG. 1 is a schematic structural diagram of an existing hot washing machine in the prior art.

A plurality of implementations or examples are provided below in this disclosure to implement different features of this disclosure. A specific example of an assembly and a configuration described below is used to simplify the disclosure. It is contemplated that such descriptions are merely examples, and are not intended to limit the disclosure. For example, in the following description, a first feature is formed on or above a second feature, and the description may include that, in some embodiments, the first feature and the second feature directly contact with each other; and the description may further include that, in some embodiments, an additional assembly is formed between the first feature and the second feature so that the first feature and the second feature may not be in direct contact. In addition, the disclosure may repeat assembly symbols and/or labels in various embodiments. The repetition is for the purpose of brevity and clarity, but does not indicate a relationship between the various embodiments and/or configurations discussed.

Further, space-related terms such as "under", "below", lower ", "above", and "over" are used herein for the ease of the description of a relationship between an assembly or a feature relative to another or a plurality of assemblies or features shown in the figure. The space-related terms are intended to encompass different orientations of the device in use or operation in addition to the orientations depicted in the figures. The device may be disposed at other orientations (for example, rotating by 90 degrees or being located at other orientations), and the space-related terms should interpret accordingly.

Value ranges and parameters that are used to define a relatively wide scope of this application are all approximate values, but related values in specific embodiments are presented herein as accurately as possible. However, any value essentially inevitably includes a standard deviation caused by an individual test method. As described herein, the term "about" generally means that an actual value falls within plus or minus 10%, 5%, 1%, or 0.5% of a specific value or range. Alternatively, the term "about" means that the actual value falls within an acceptable standard error of an average value, depending on the consideration of a person of ordinary skill in the art of this application. It should be understood that, in addition to experimental examples, or unless otherwise clearly stated, all ranges, quantities, values, and percentages (for example, being used for describing material use amount, time length, temperature, operation condition, quantity ratio, and the like) used herein are all modified by "about". Therefore, unless otherwise stated, the values or parameters disclosed in this specification and the appended claims are all approximate values, and may be changed as required. At least these values or parameters should be considered as indicated valid bits and the value obtained by applying the general rounding method. As described herein, the value range is expressed to move from one end to another end or locate between the two ends; and unless otherwise stated, the value range described herein include endpoints.

The present invention is further described in detail below with reference to the accompanying drawings.

Figure 2:
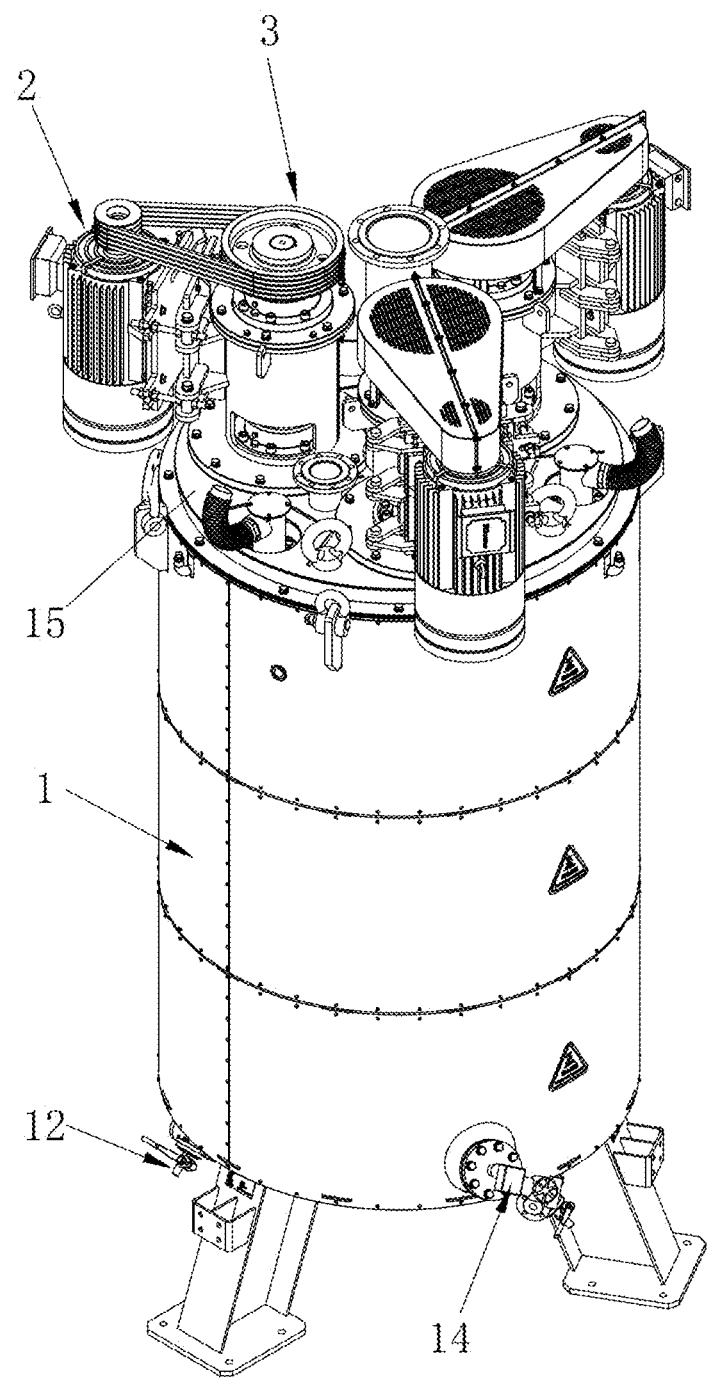
FIG. 2 is a schematic diagram of an overall structure of the present invention.

FIG. 2 is a multi-axis variable-speed hot washing machine disclosed in the present invention, including a cleaning chamber 1, a drive apparatus 2, and a rotation mechanism 3. The rotation mechanism 3 is arranged in an inner cavity of the cleaning chamber 1 and is in transmission connection with the drive apparatus 2. At least one or more groups of rotation mechanism 3 is arranged. In this embodiment, three groups of rotation mechanisms 3 are configured. The inner wall of the cleaning chamber 1 is provided with a scraping mechanism that enhances a squeezing and frictional cleaning effect on a to-be-cleaned material.

Figure 3:
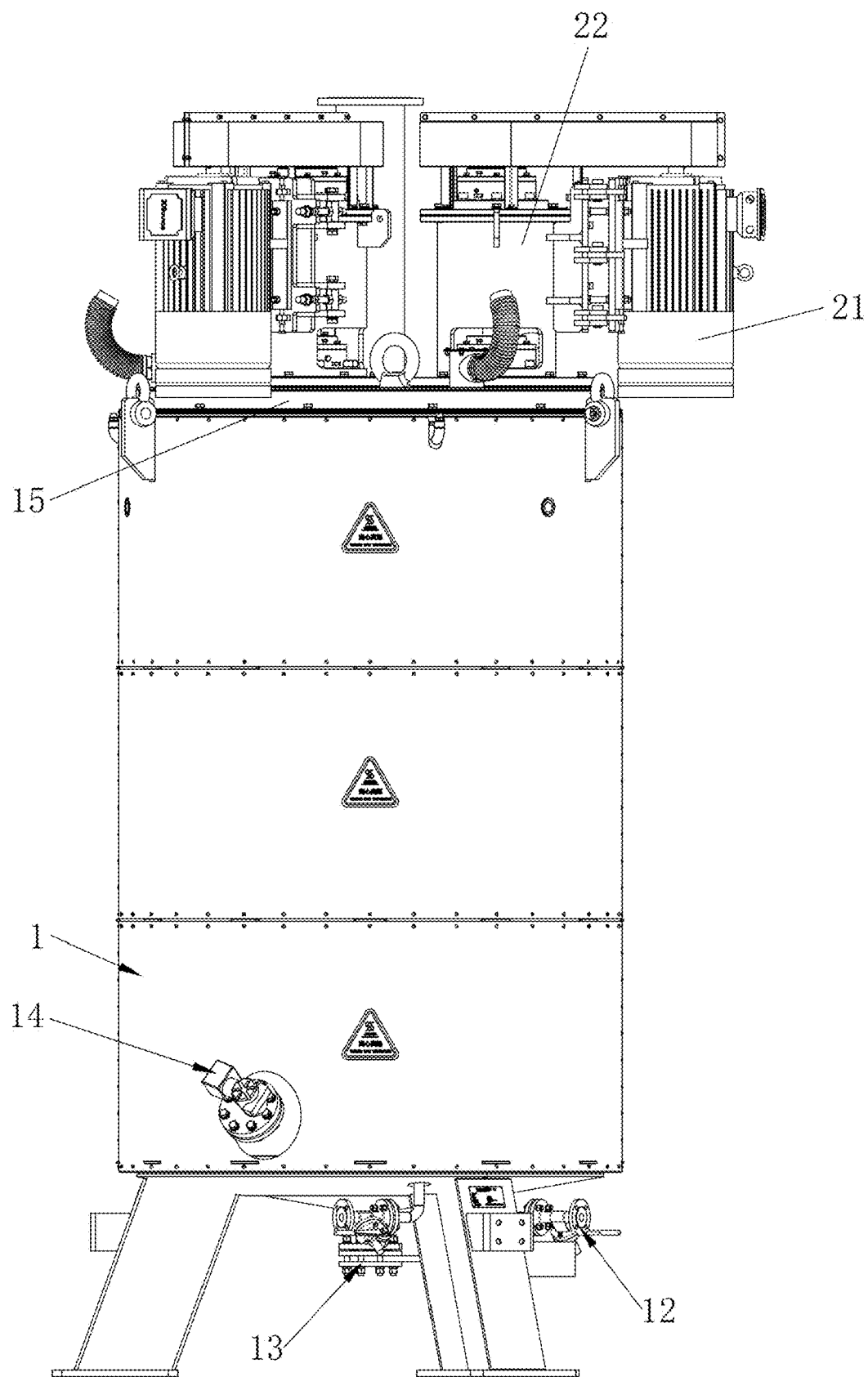
FIG. 3 is a front view of the present invention.

Referring to FIG. 3, the bottom of the cleaning chamber 1 is provided with a plug valve 13 connected to the inside of the cleaning chamber 1, wherein the plug valve 13 is configured to separate a water pump during cleaning, so as to prevent materials and cleaning water from entering the water pump during cleaning. After the cleaning is completed, the plug valve 13 is turned on, and bottle flakes and the cleaning water may be pumped out together through the water pump. In this embodiment, the plug valve 13 is detachably fixed on the bottom of the cleaning chamber 1 through bolts and flanges. The materials are discharged at the bottom of the cleaning chamber 1 through the water pump, which avoids a loss of medicinal water and materials, increases a recycling rate of the bottle flakes, and reduces device and space costs.

A differential pressure transmitter 14 is mounted on the outer side wall of the cleaning chamber 1, can be configured to control a level of the liquid in the cleaning chamber 1, and is connected on the outer side wall of the cleaning chamber 1 through bolts and flanges in this embodiment.

A cover plate 15 is detachably fixedly connected to the top of the cleaning chamber 1, and the drive apparatus 2 is mounted on the surface of the cover plate 15 away from the cleaning chamber 1. In this embodiment, the cover plate 15 is connected to the cleaning chamber 1 through bolts, which is convenient for disassembly and maintenance of the machine. The drive apparatus 2 is mounted on the cover plate 15, and can stably provide power for a cleaning blade shaft 31, which improves practicality.

The drive apparatus 2 includes a motor 21 and a bearing seat assembly 22, the motor 21 is in transmission connection with the bearing seat assembly 22 through a belt, and the bearing seat assembly 22 is in transmission connection with the cleaning blade shaft 31. Transmission of the motor 21 of the drive apparatus 2 drives the bearing seat assembly 22 to rotate, and transmission of the bearing seat assembly 22 drives the cleaning blade shaft 31 to rotate, so that the materials can be intensely stirred and cleaned in the cleaning chamber 1, which can effectively remove dirt and impurities on the bottle flakes and scrape off labels and glue on the bottle flakes.

In this embodiment, the motor 21 is configured as a variable-frequency motor 21. The arrangement of the variable-frequency motor 21 enables the cleaning blade shaft 31 to adjust the speed during rotating, so as to adapt to different quantities of materials. On the basis of ensuring the cleaning effect on the materials, the service life of the motor 21 is increased.

Figure 4:
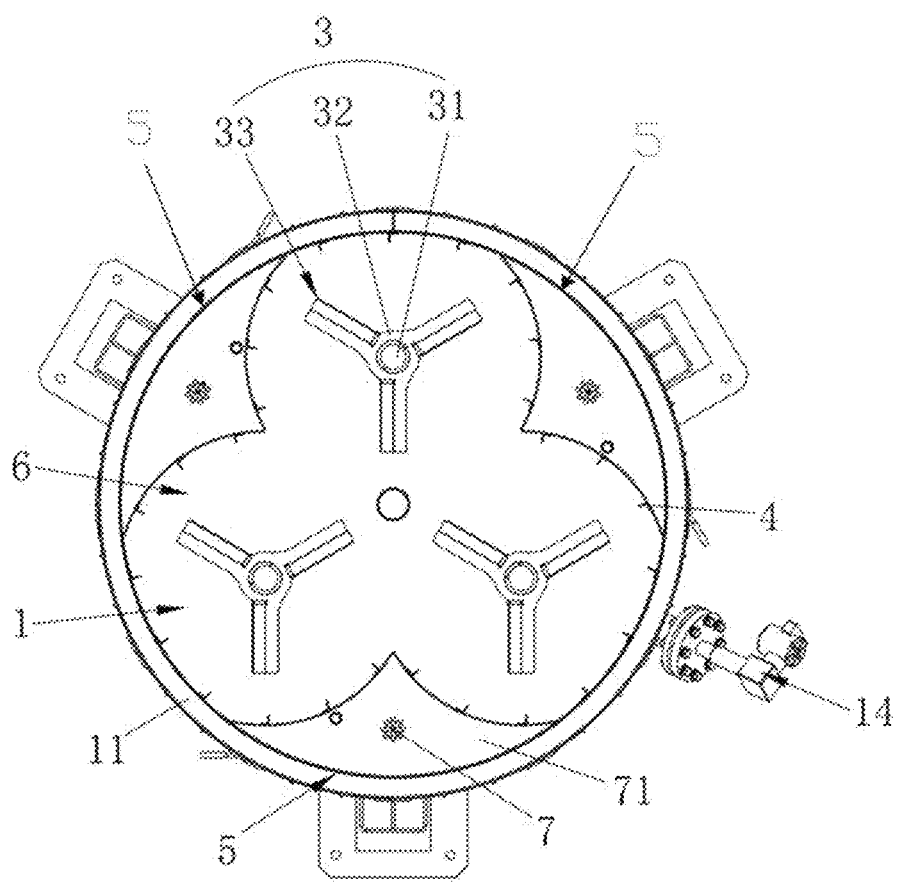
FIG. 4 is a top view of the present invention (omitting a cover plate).
Figure 5:
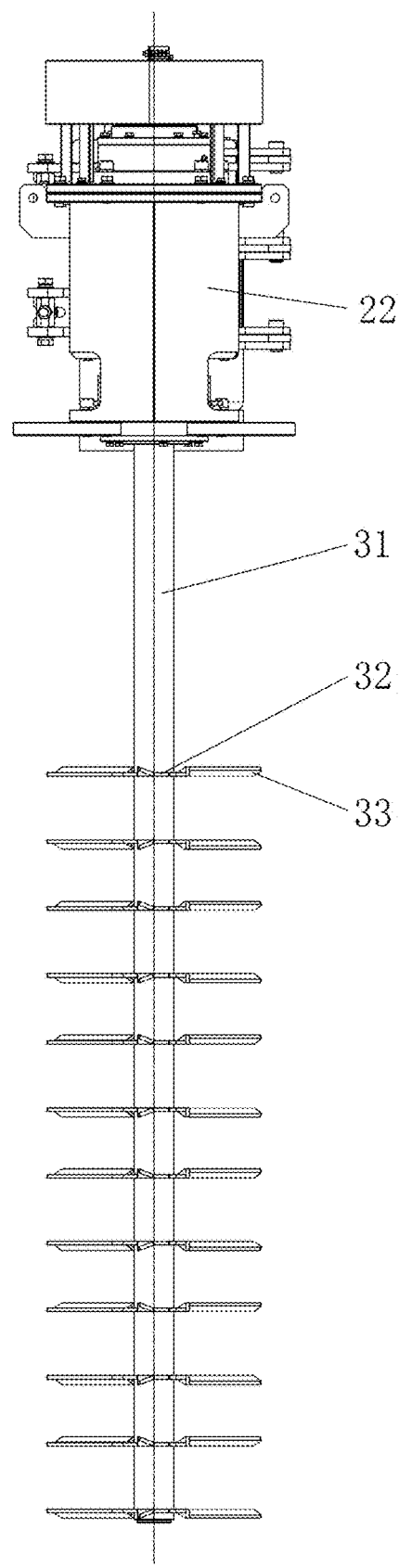
FIG. 5 is a front view of a cleaning blade shaft according to the present invention.

Referring to FIG. 4, the scraping mechanism includes a plurality of scraper 4 fixed on the inner wall of the cleaning chamber 1. In this embodiment, the scraper 4 are evenly fixed on the inner wall of the cleaning chamber 1, and a cross section of each scraping blade 4 is in an "L" shape. The upper and lower ends of each scraper 4 extend to the top and bottom of the inner wall of the cleaning chamber 1, so as to ensure a scraping effect on the labels or glue. The arrangement of the scraper 4 causes the inner wall of the cleaning chamber 1 to be non-smooth. On the one hand, a friction angle between the bottle flakes and the inner wall of the cleaning chamber 1 can be increased, so as to increase friction between the bottle flakes; and on the other hand, the scraper 4 block the materials during the operation of the device, thereby increasing friction to increase a removal rate of the labels or glue.

Further, three groups of rotation mechanisms 3 are arranged, and each group of rotation mechanism 3 is configured with the drive apparatus 2. Such arrangement enables each rotation mechanism 3 to operate independently, so that it is convenient to selectively turn on different quantities of drive apparatuses 2 according to different situations. In this way, the plurality of rotation mechanisms 3 can work individually without interfering with each other, which improves practicality. In addition, three groups of rotation mechanisms 3 are arranged, and the three groups of rotation mechanisms 3 share the drive apparatus 2. Such arrangement enables the three groups of rotation mechanisms 3 to operate synchronously.

The rotation mechanism 3 includes a cleaning blade shaft 31 and a plurality of rotor disks 32 arranged on the cleaning blade shaft 31 in the axial direction. The axial line of the cleaning blade shaft 31 and the axial line of the cleaning chamber 1 are parallel to each other. The cleaning blade shaft 31 is in transmission connection with the drive apparatus 2, and each rotor disk 32 is provided with several partially inclined blades 33.

During cleaning of the materials, the drive apparatus 2 drives the cleaning blade shaft 31 to rotate, and the cleaning blade shaft 31 drives the blades 33 to rotate through the rotor disks 32. When two or more rotating shafts rotate in reverse directions, the rotor disks drive the blades 33 to continuously rotate to generate a high-speed water flow. The to-be-cleaned materials rotate at a high speed in the water under high-speed guiding of blades 33 of rotor disks of two adjacent rotating shafts in the high-speed water flow, so that the materials rub against the scraping mechanism at a high temperature.

A plurality of cleaning blade shafts 31 are evenly distributed in the cavity of the cleaning chamber 1, so that the cleaning blade shafts 31 occupy as much volume as possible in the cavity, thereby limiting a space where the materials can stay in the cavity, reducing a movement range of the materials and greatly increasing friction between the materials during the operation of the device, and improving the cleaning effect on the materials.

In addition, the blades 33 that are arranged partially inclined can not only stir the materials to cause materials to rotate, but also cause the materials to squeeze and rub against each other when moving between the cleaning blade shafts 31. Compared with a traditional single uniformly inclined blade 33, the used partially inclined blade 33 has a folded edge, so that the structure of the blade 33 has higher intensity and is not easy to break during use, which increases the service life of the blade 33.

Each blade 33 is integrally formed and fixedly connected on the side wall of each rotor disk 32 extending outwardly, and several blades 33 are evenly distributed around the rotor disk 32 in the circumferential direction and. The rotor disk 32 is fixed on the cleaning blade shaft 31 by welding, and the blades 33 and the rotor disk 32 are integrally formed and fixedly connected to each other, which not only increases the structural intensity of the blades 33, but also facilitates manufacturing and welding. Moreover, there is no gap between the rotor disk 32 and the blade 33, thereby preventing the bottle flakes from being stuck in the gap between the blade 33 and the rotor disk 32. The blades 33 are evenly distributed around the rotor disk 32 in the circumferential direction and, so that centrifugal forces on the outer circumference of the cleaning blade shaft 31 are the same, to ensure that the cleaning blade shaft 31 rotates stably.

Figure 6:
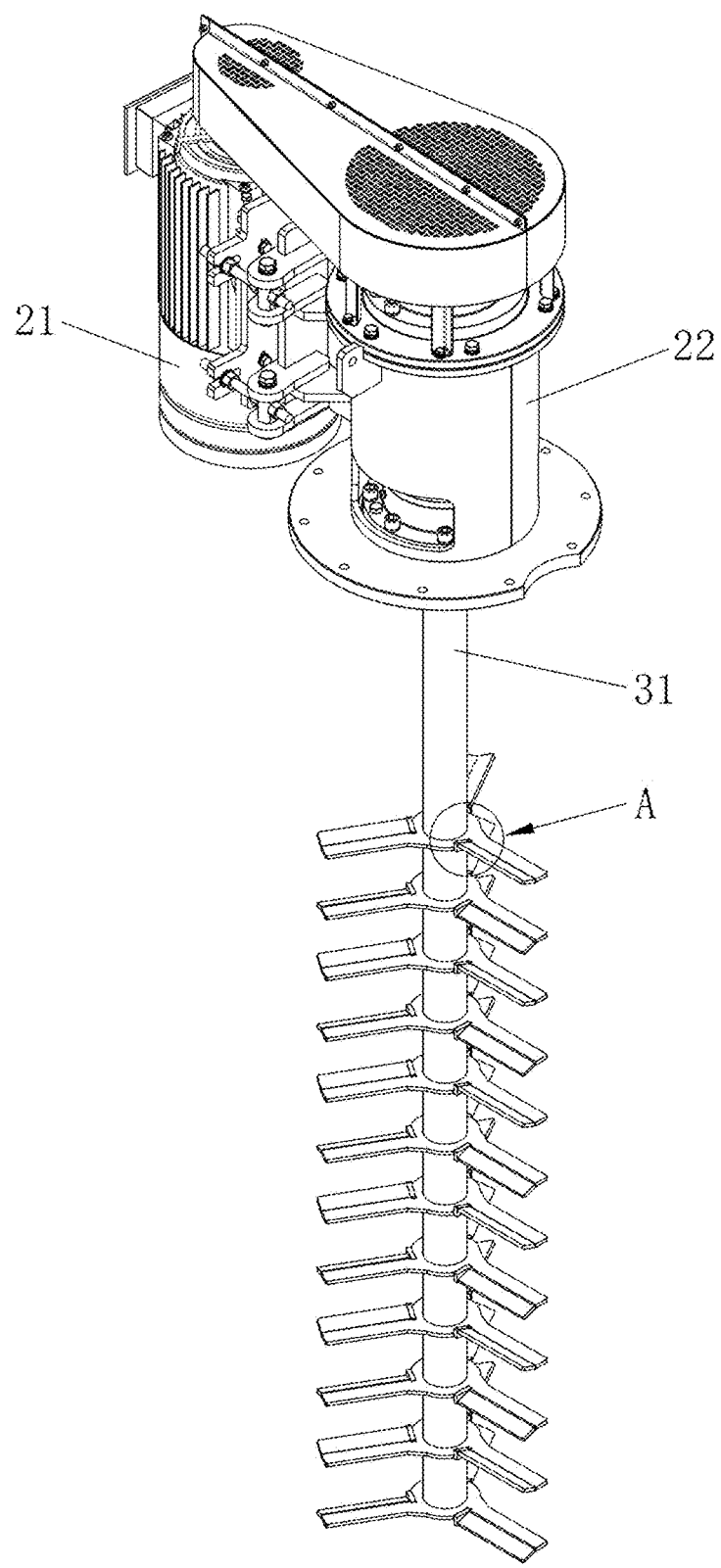
FIG. 6 is a schematic structural diagram of a cleaning blade shaft according to the present invention.
Figure 7:
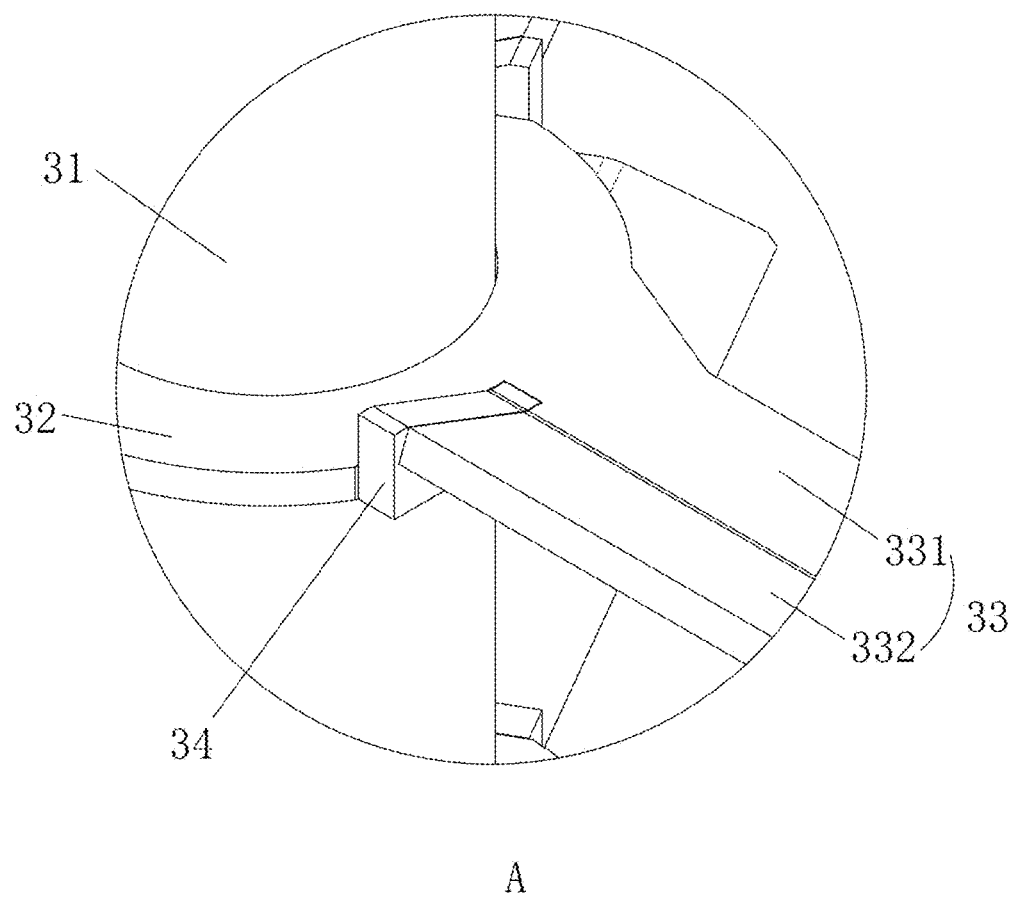
FIG. 7 is a schematic enlarged view of part A in FIG. 6.

Referring to FIG. 6 and FIG. 7, the blade 33 is configured as a strip-shaped plate structure and extends outward in the radial direction of the rotor disk 32. The blade 33 includes an anti-bending plate 331 and an inclined plate 332, where the anti-bending plate 331 and the inclined plate 332 are integrally formed and fixedly connected to each other. The anti-bending plate 331 is horizontally arranged relative to a horizontal rotation track plane of the rotor disk 32, and the inclined plate 332 is obliquely arranged relative to the horizontal rotation track plane of the rotor disk 32. On the one hand, the inclined plate 332 can stir the materials to cause the materials to rotate, and meanwhile can enable the materials to squeeze and rub against each other between the blades 33 when moving between the cleaning blade shafts 31, thereby further improving the scraping and cleaning effects.

Referring to FIG. 7, a reinforcing member 34 is fixedly connected on the rotor disk 32, and the end of the inclined plate 332 close to the rotor disk 32 is fixed on the reinforcing member 34. The reinforcing member 34 improves the structural stability of the inclined plate 332, so that the inclined plate is less likely to be split.

Referring to FIG. 6, on a same cleaning blade shaft 31, inclined plates 332 of any two adjacent rotor disks 32 incline in a same direction or opposite directions. In this embodiment, on a same cleaning blade shaft 31, inclined plates 332 of any two adjacent rotor disks 32 incline in opposite directions, which can ensure that the materials squeeze and rub against each other between the blades 33 when moving between the cleaning blade shafts 31, thereby improving the scraping and cleaning effects.

An angle of inclination of the inclined plate 332 relative to the horizontal anti-bending plate 331 is &, and $0°<\&≤90°$. In this embodiment, & is $21°$.

Referring to FIG. 4, the cleaning chamber 1 is internally provided with a heating mechanism configured to heat the cleaning water. The heating mechanism can heat the cleaning water in the cleaning chamber 1, which on the one hand can effectively remove the impurities and dirt on the surfaces of the bottle flakes, and on the other hand can soften the labels or glue on the bottle flakes and make it easy to scrape off the labels or glue during scraping and cleaning, thereby improving the cleaning effect on the bottle flakes.

Further, the inner cavity of the cleaning chamber 1 is provided with a plurality of liners 5, where the end of each liner 5 away from the inner wall of the cleaning chamber 1 is offset toward the central axis of the cleaning chamber 1. A hot washing sub-cavity 6 is formed between every two adjacent liners 5, and a plurality of hot washing sub-cavities 6 are in communication with each other and form the inner cavity of the cleaning chamber 1.

The arrangement of the plurality of liners 5 increases a friction area between the inner wall of the cleaning chamber 1 and the bottle flakes, and limits the materials in the multi-blade liners 5 containing scraper 4, so that the materials, the blades 33, and the barrel body are in full contact with each other for stirring and rubbing, thereby improving the cleaning effect on the bottle flakes and better cleaning the bottle flakes. On the other hand, the space for the materials to stay in the cavity is further reduced, thereby reducing a movement range of the materials and greatly increasing friction between the materials during the operation of the device, and ensuring intensity of cleaning. In this embodiment, a design of a three-blade liner 5 is adopted, and tests show that the design of the three-blade liner 5 has the best cleaning effect.

The plurality of rotation mechanisms 3 are respectively evenly distributed in the hot washing sub-cavities 6. One rotation mechanism 3 is arranged in a hot washing sub-cavity 6, which can not only ensure the rotation stability of the rotation mechanism 3, but also improve the balance of the cleaning chamber 1.

Referring to FIG. 4, the heating mechanism includes a plurality of heating rods 7, the liners 5 are provided with heat conducting oil 71, and the heating rods 7 are mounted in the liners 5 to heat the heat conducting oil 71. The heating rods 7 are energized to heat the heat conducting oil 71 in the liners 5, and the heat conducting oil 71 transfers heat to the cleaning water in the cleaning chamber 1 to increase a temperature of the cleaning water and facilitate the removal of the impurities and dirt on the bottle flakes.

A temperature sensor is mounted in each heating rod 7, and can monitor a temperature of the heating rod 7 in real time, so that a worker can adjust power of the heating rod 7 in real time. The outer wall of the cleaning chamber 1 is provided with an insulation layer 11. The insulation layer 11 can reduce a heat loss inside the cleaning chamber 1 after the heating rods 7 heat the heat conducting oil 71, and improve a utilization rate of heat energy. The bottom of the cleaning chamber 1 is provided with a drain valve 12 connected to the inside of the liner 5. The drain valve 12 can be configured to discharge the heat conducting oil 71 during device maintenance.

A plurality of cleaning blade shafts 31 are evenly distributed in the cavity of the cleaning chamber 1. A plurality of liners 5 are arranged inside the cavity. One end of each liner 5 is offset along the central line of the cleaning chamber 1, so that the cleaning blade shafts 31 occupy as much volume as possible in the hot washing sub-cavities 6, thereby limiting a space where the materials can stay in the cavity, reducing a movement range of the materials and greatly increasing friction between the materials during the operation of the device, and improving the cleaning effect on the bottle flakes.

A scraping mechanism is added on the inner wall, and can block the materials during the operation of the device to increase friction. The blades 33 of the cleaning blade shaft 31 are arranged intermittently in the same direction, that is, the orientation between adjacent blades is in a shape of "∧", so that the materials squeeze and rub against each other between the blades 33 when moving between the cleaning blade shafts 31. A higher rotating speed of the cleaning blade shafts 31 indicates greater friction on the surfaces of the bottle flakes and cleaner bottle flakes after cleaning. The materials are discharged at the bottom through the water pump, thereby reducing device and space costs.

Performance test comparison between multi-axis variable-speed hot washing and traditional hot washing.

A method for detecting a cleaning ability of a machine:

The cleaning ability is determined by detecting content of residual impurities in materials after recycled materials are cleaned by a hot washing machine. In practice, the materials are completely melted and the residual impurities are intercepted through a high-precision filter, and a difference of pressure formed before and after the filter is detected to evaluate the content of the residual impurities. A greater difference of pressure indicates more residual impurities and a poorer cleaning effect, while a smaller difference of pressure indicates fewer residual impurities and a better cleaning effect.

Performance Index:

Sample Analysis Instructions:

Under the same condition, the bottle flakes provided by different domestic manufacturers are checked and tested several times, and whether the bottle flakes meet a standard is determined according to the pressure and throughput.

Determining standards (the higher the throughput is, the cleaner the bottle flakes are):

bottle flakes whose throughput ≥7.5 kg are grade 3A bottle flakes;

bottle flakes whose throughput ≥5.5 kg and <7.5 kg are grade 2A bottle flakes;

bottle flakes whose throughput ≥3.5 kg and <5.5 kg are grade 1A bottle flakes; and bottle flakes whose throughput <3.5 kg are substandard bottle flakes.

The abscissa is throughput/g, and the ordinate is pressure/bar.

Figure 8:
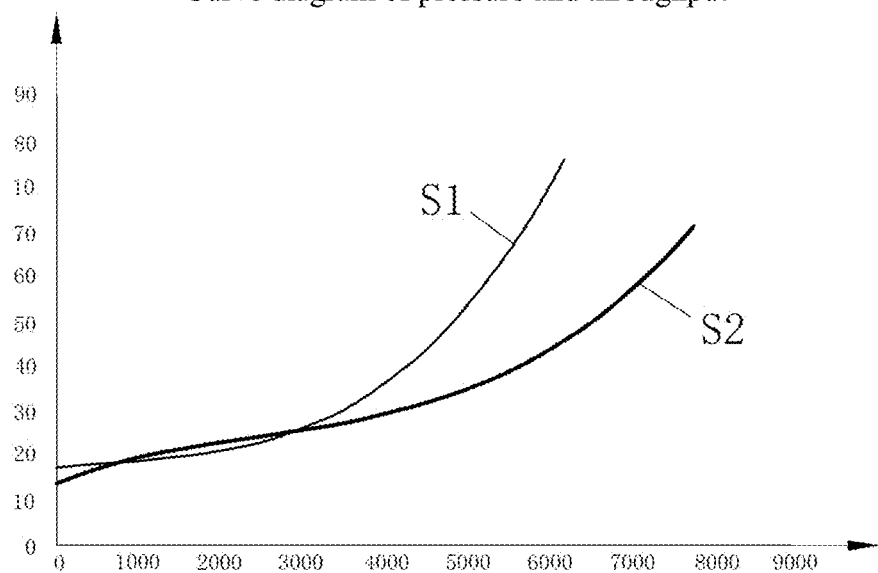
FIG. 8 is a curve diagram of pressure and throughput after tests on bottle flakes according to the present invention.

Referring to FIG. 8, S2 is a curve of the multi-axis variable-speed heat cleaning, and S1 is a curve of the traditional heat cleaning.

SUMMARY

To sum up, the cleaning performance of the multi-axis variable-speed hot washing machine is much higher than that of a traditional hot washing machine. Bottle flakes cleaned by the multi-axis variable-speed hot washing machine can reach a quality level of highest-quality bottle flakes in the market.

An implementation principle of this embodiment is as follows: During cleaning of plastic bottle flakes, a proportion of materials and medicinal water is added into the cleaning chamber 1, the rotation mechanisms 3 stir and wash the materials. Dirt and impurities on the bottle flakes are removed, and labels or glue on the bottle flakes are softened and removed. During cleaning, bottle flakes rub against other bottle flakes, the rotation mechanisms 3, the inner wall of the cleaning chamber 1, and the scraping mechanism, so as to remove softened labels or glue and improve the cleaning effect.

This machine combines the processes of hot washing and friction, and combines the functions of the three devices. Using one device can effectively remove the dirt and impurities on the bottle flakes and improve the cleaning efficiency. In addition, this multi-axis variable-speed hot washing machine occupies a small volume, has a variable speed, a small volume, short time, and high efficiency, thereby reducing device costs and having good economic promotion value.

Compared with a conventional design of a single cleaning blade shaft 31, the adopted design of a plurality of groups of cleaning blade shafts 31 greatly reduces workload of the cleaning blade shafts 31, and lowers requirements on a size and intensity of the structure of the cleaning blade shafts 31, thereby implementing a high-speed cleaning function that cannot be implemented by the traditional cleaning machine. In addition, the cleaning blade shafts 31 are designed to be adjustable in speed. When the materials start to be cleaned, the cleaning blade shafts 31 operate at a low speed, so that the materials are fully mixed with the high-temperature cleaning liquid to achieve the purpose of preheating and pre-cleaning the materials. Then, the machine switches to high-speed cleaning. The materials are driven by the cleaning blade shafts 31 at a high speed in the cleaning chamber 1, so as to realize strong cleaning of the materials between blade shaft layers, between the blade shafts, and between the blade shafts and the friction cleaning apparatus in the cleaning chamber 1. In addition, the design of a plurality of cleaning blade shafts 31 enables the materials to change the cleaning track between the cleaning blade shafts 31 during cleaning, to avoid generating material cleaning dead angle. Compared with the traditional hot washing design, this design can produce a stronger cleaning ability without dead angle.

The substantial increase in mechanical cleaning ability overcomes a shortcoming that in a traditional hot washing method, obtaining a sufficient cleaning ability is realized only by increasing the volume of the device, increasing the cleaning time, and increasing devices. This design has advantages of a strong cleaning ability, a small occupied area, low operation consumption, and the like, and has excellent market promotion value.

The foregoing generally describes features of several embodiments so that those skilled in the art may better understand aspects of this application. Those skilled in the art should understand that they can readily use this application as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and modifications herein without departing from the spirit and scope of this disclosure.

Furthermore, the scope of this application is not limited to specific embodiments of the processes, machines, manufacturing, material compositions, components, methods, and steps described in the specification. Those of ordinary skill in the art readily understand, according to the content disclosed in this disclosure, that they may use, according to this disclosure, the processes, machines, manufacturing, material compositions, components, methods, or steps that exist currently or are developed subsequently and that overall execute the same functions as those in the corresponding embodiments described herein or overall implement the same results. Therefore, the appended claims intend to include such processes, machines, manufacturing, material compositions, components, methods, or steps within the scope thereof.

We claim:

1. A multi-axis variable-speed hot washing machine, comprising a cleaning chamber, a drive apparatus, and a rotation mechanism, and the rotation mechanism being arranged inside an inner cavity of the cleaning chamber and being in transmission connection with the drive apparatus, wherein at least one group of rotation mechanism is arranged, and an inner wall of the cleaning chamber is provided with a scraping mechanism that enhances a squeezing and frictional cleaning effect on a to-be-cleaned material;

wherein a plurality of liners are arranged in the inner cavity of the cleaning chamber, one end of each of the liners away from an inner side wall of the cleaning chamber offsets toward a central axis of the cleaning chamber, and the plurality of liners are free from contacting each other.

2. The multi-axis variable-speed hot washing machine of claim 1, wherein the scraping mechanism comprises a plurality of scrapers fixed on the inner wall of the cleaning chamber.

3. The multi-axis variable-speed hot washing machine of claim 1, wherein three groups of rotation mechanisms are arranged, and each rotation mechanism is configured with the drive apparatus.

4. The multi-axis variable-speed hot washing machine of claim 1, wherein three groups of rotation mechanisms are arranged, and the three groups of rotation mechanisms share the drive apparatus.

5. The multi-axis variable-speed hot washing machine of claim 1, wherein the rotation mechanism comprises a cleaning blade shaft and a plurality of rotor disks arranged on the cleaning blade shaft in the axial direction, an axial line of the cleaning blade shaft and an axial line of the cleaning chamber being parallel to each other, the cleaning blade shaft being in transmission connection with the drive apparatus, and each rotor disk being provided with several partially inclined blades.

6. The multi-axis variable-speed hot washing machine of claim 5, wherein each blade is integrally formed and fixedly connected on a side wall of each rotor disk extending outwardly, and several blades are evenly distributed around the rotor disk in the circumferential direction.

7. The multi-axis variable-speed hot washing machine of claim 6, wherein the blade is configured as a strip-shaped plate structure, and comprises an anti-bending plate and an inclined plate, the anti-bending plate and the inclined plate being integrally formed and fixedly connected to each other,
the anti-bending plate being horizontally arranged, and
the inclined plate being obliquely arranged.

8. The multi-axis variable-speed hot washing machine of claim 7, wherein a reinforcing member is fixedly connected on the rotor disk, and an end of the inclined plate close to the rotor disk is fixed on the reinforcing member.

9. The multi-axis variable-speed hot washing machine of claim 7, wherein on a same cleaning blade shaft, blades on any two adjacent rotor disks incline in a same direction or opposite directions.

10. The multi-axis variable-speed hot washing machine of claim 7, wherein an angle of inclination of the inclined plate relative to the horizontal anti-bending plate is &, and $0°<\&\leq 90°$.

11. The multi-axis variable-speed hot washing machine of claim 10, wherein & is 21°.

12. The multi-axis variable-speed hot washing machine of claim 1, wherein the cleaning chamber is internally provided with a heating mechanism configured to heat cleaning water.

13. The multi-axis variable-speed hot washing machine of claim 1, wherein
a hot washing sub-cavity is formed between every two adjacent liners, a plurality of hot washing sub-cavities being in communication with each other and forming the inner cavity of the cleaning chamber.

14. The multi-axis variable-speed hot washing machine of claim 13, wherein a plurality of rotation mechanisms are respectively evenly distributed in the hot washing sub-cavities.

15. The multi-axis variable-speed hot washing machine of claim 1, wherein an outer wall of the cleaning chamber is provided with an insulation layer.

16. The multi-axis variable-speed hot washing machine of claim 1, wherein a bottom of the cleaning chamber is provided with a drain valve connected to the inside of the liners.

17. The multi-axis variable-speed hot washing machine of claim 1, wherein a bottom of the cleaning chamber is provided with a plug valve connected to the inside of the cleaning chamber.

18. The multi-axis variable-speed hot washing machine of claim 1, wherein a differential pressure transmitter is mounted on an outer side wall of the cleaning chamber and configured to control a level of liquid in the cleaning chamber.

19. The multi-axis variable-speed hot washing machine of claim 1, wherein a cover plate is detachably fixedly connected to a top of the cleaning chamber, and the drive apparatus is mounted on a surface of the cover plate away from the cleaning chamber.

20. The multi-axis variable-speed hot washing machine of claim 1, wherein the drive apparatus comprises a motor and a bearing seat assembly, the motor being in transmission connection with the bearing seat assembly through a belt, and the bearing seat assembly being in transmission connection with a cleaning blade shaft.

* * * * *